(12) United States Patent
Helle

(10) Patent No.: US 12,438,326 B2
(45) Date of Patent: Oct. 7, 2025

(54) ADAPTIVE SPATIO-TEMPORAL OPTICAL PULSE SHAPER

(71) Applicant: The Government of the United States of America, as represented by the Secretary of the Navy, Arlington, VA (US)

(72) Inventor: Michael H. Helle, Arlington, VA (US)

(73) Assignee: The Government of the United States of America, as represented by the Secretary of the Navy, Arlington, VA (US)

( * ) Notice: Subject to any disclaimer, the term of this patent is extended or adjusted under 35 U.S.C. 154(b) by 544 days.

(21) Appl. No.: 18/050,063

(22) Filed: Oct. 27, 2022

(65) Prior Publication Data

US 2023/0163549 A1 May 25, 2023

Related U.S. Application Data

(60) Provisional application No. 63/272,364, filed on Oct. 27, 2021.

(51) Int. Cl.
*H01S 3/00* (2006.01)
(52) U.S. Cl.
CPC ........ *H01S 3/0057* (2013.01); *G02F 2203/26* (2013.01)
(58) Field of Classification Search
CPC ............... H01S 3/0057; G02B 27/0927; G02F 2203/26
See application file for complete search history.

(56) References Cited

U.S. PATENT DOCUMENTS 5,719,650 A * 2/1998 Wefers ................ G02F 1/13471
349/75
7,561,605 B1 7/2009 Delfyett et al.
(Continued)

FOREIGN PATENT DOCUMENTS

WO WO 2007/144205 A2 * 12/2007 ........... H01S 3/0057
WO 2012164483 A1 12/2012

OTHER PUBLICATIONS

D. H. Froula, et al., "Flying focus: Spatial and temporal control of intensity for laser-based applications," Physics of Plasmas 26, 032109 (2019).

(Continued)

*Primary Examiner* — James A Menefee
(74) *Attorney, Agent, or Firm* — US Naval Research Laboratory; Joslyn J. Barritt

(57) ABSTRACT

A fully programmable laser field shaping apparatus that can configure a beam of laser pulses in both shape and time to generate laser pulses with varying spatio-temporal profiles for adaptive nonlinear optical propagation. The laser field shaping scheme in accordance with the present invention, Adaptive Spatio-Temporal Optical Pulse Shaper (A-STOPS), utilizes dispersive elements and a programmable spatial varying optical element (e.g. deformable mirror, spatial light modulator, etc.) to impose spatial variations on each frequency component of a laser pulse. Each frequency component maps directly to a temporal slice within a chirped laser pulse. The result is the ability to generate complex spatio-temporal variation on a laser pulse with wide ranging applications in linear and nonlinear optics.

2 Claims, 3 Drawing Sheets

(56) References Cited

U.S. PATENT DOCUMENTS

| | | |
|---|---|---|
| 11,444,425 B2 | 9/2022 | Yusim et al. |
| 2009/0116009 A1* | 5/2009 | Nelson .................. G01J 3/0224 356/326 |
| 2009/0122819 A1 | 5/2009 | Dantus et al. |
| 2016/0294146 A1 | 10/2016 | Tsia et al. |
| 2019/0204626 A1* | 7/2019 | Watanabe ................. G02F 1/01 |

OTHER PUBLICATIONS

S.W. Jolly et al., "Controlling the velocity of a femtosecond laser pulse using refractive lenses," Opt. Express 28, 4888-4897 (2020).
Z. Li et al., "Theoretical method for generating regular spatiotemporal pulsed-beam with controlled transverse-spatiotemporal dispersion," Optical Communications, vol. 432, pp. 91-96, (2019).

\* cited by examiner

ADAPTIVE SPATIO-TEMPORAL OPTICAL PULSE SHAPER

CROSS-REFERENCE

This Application is a Nonprovisional of and claims the benefit of priority under 35 U.S.C. § 119 based on U.S. Provisional Patent Application No. 63/272,364 filed on Oct. 27, 2021. The Provisional Application and all references cited therein are hereby incorporated by reference into the present disclosure in their entirety.

FEDERALLY-SPONSORED RESEARCH AND DEVELOPMENT

The United States Government has ownership rights in this invention. Licensing inquiries may be directed to Office of Technology Transfer, US Naval Research Laboratory, Code 1004, Washington, D.C. 20375, USA; +1.202.767.7230; techtran@nrl.navy.mil, referencing Navy Case #210618.

TECHNICAL FIELD

The present disclosure is related to the field of lasers and laser pulse shaping.

BACKGROUND

High-peak-power lasers are the drpiving technology behind fields such as laser machining, laser filamentation, fs-chemistry, and next-generation particle accelerators and light sources to name a few. Although many areas require dispersion compensation and/or transverse control (i.e. focusing), these are typically handled independently. As a result, a single pulse will have a fixed transverse profile applied over its whole-time history.

However, the laser field often evolves both spatially and temporally when propagating through or interacting with a nonlinear media. Full spatio-temporal tailoring is therefore desirable to enhance control of these nonlinear effects. Adaptive control is further desired for optimizing parameters for a fixed nonlinear media and/or necessary for any nonlinear media or laser source that is dynamically changing. This adaptive control is not currently available.

Current approaches rely on independently applying spatial control and temporal control of the laser pulse by using specialized optical elements to apply a spatio-temporal profile or by only applying shaping to one spatial dimension. See D. H. Froula, et al., "Flying focus: Spatial and temporal control of intensity for laser-based applications," *Physics of Plasmas* 26, 032109 (2019); S. W. Jolly et al., "Controlling the velocity of a femtosecond laser pulse using refractive lenses," *Opt. Express* 28, 4888-4897 (2020); and Z. Li et al., "Theoretical method for generating regular spatiotemporal pulsed-beam with controlled transverse-spatiotemporal dispersion," *Optical Communications*, vol. 432, pp. 91-96, (2019).

However, none of these approaches provides full spatio-temporal control of the laser field. Froula does not spatio-temporally shape the pulse but tries to use a combination of the two to provide some control. Although Jolly et al. does produce a spatio-temporal shaped pulse, their approach uses a fixed optical element that must be precisely produced with limited flexibility. And Li does not enable full spatio-temporal pulse shaping in both transverse dimensions.

SUMMARY

This summary is intended to introduce, in simplified form, a selection of concepts that are further described in the Detailed Description. This summary is not intended to identify key or essential features of the claimed subject matter, nor is it intended to be used as an aid in determining the scope of the claimed subject matter. Instead, it is merely presented as a brief overview of the subject matter described and claimed herein.

The present invention provides a fully programmable laser field shaping apparatus that can controllably configure a beam of laser pulses in both shape and time to generate laser pulses with varying spatio-temporal profiles for adaptive nonlinear optical propagation.

The laser field shaping scheme in accordance with the present invention, Adaptive Spatio-Temporal Optical Pulse Shaper (A-STOPS), utilizes dispersive elements and a programmable spatial varying optical element (e.g. deformable mirror, spatial light modulator, etc.) to impose spatial variations on each frequency component of a laser pulse. Here each frequency component maps directly to a temporal slice within a chirped laser pulse. The result is the ability to generate complex spatio-temporal variation on a laser pulse with wide ranging applications in linear and nonlinear optics.

To illustrate the utility of such a device, a time-varying geometric focus can be applied such that the front and the back have a shorter focal length than the peak of the pulse. This is of great utility for pulses undergoing Kerr nonlinear focusing where the peak of the pulse nonlinearly focuses sooner than the front and the back. By properly tailoring the spatio-temporal profile, all temporal portions of the pulse can focus at the same point. Enabling adaptive control is necessary for optimization and/or to correct for any pulse-to-pulse variations in the laser pulse or the nonlinear media.

DETAILED DESCRIPTION

The aspects and features of the present invention summarized above can be embodied in various forms. The following description shows, by way of illustration, combinations and configurations in which the aspects and features can be put into practice. It is understood that the described aspects, features, and/or embodiments are merely examples, and that one skilled in the art may utilize other aspects, features, and/or embodiments or make structural and functional modifications without departing from the scope of the present disclosure.

The present invention provides a fully programmable laser field shaping element that can shape a laser pulse in both shape and time to generate laser pulses with varying spatio-temporal profiles for adaptive nonlinear optical propagation.

These and other aspects of the invention are described below with reference to the FIGURES, which are incorporated into and form a part of the present disclosure.

The laser field shaping scheme in accordance with the present invention, Adaptive Spatio-Temporal Optical Pulse Shaper (A-STOPS), utilizes dispersive elements and a programmable spatial varying optical element (e.g. deformable mirror, spatial light modulator, etc.) to impose spatial variations on each frequency component of a laser pulse. Here each frequency component maps directly to a temporal slice within a chirped laser pulse. The result is the ability to generate complex spatio-temporal variation on a laser pulse with wide ranging applications in linear and nonlinear optics.

Figure 1:
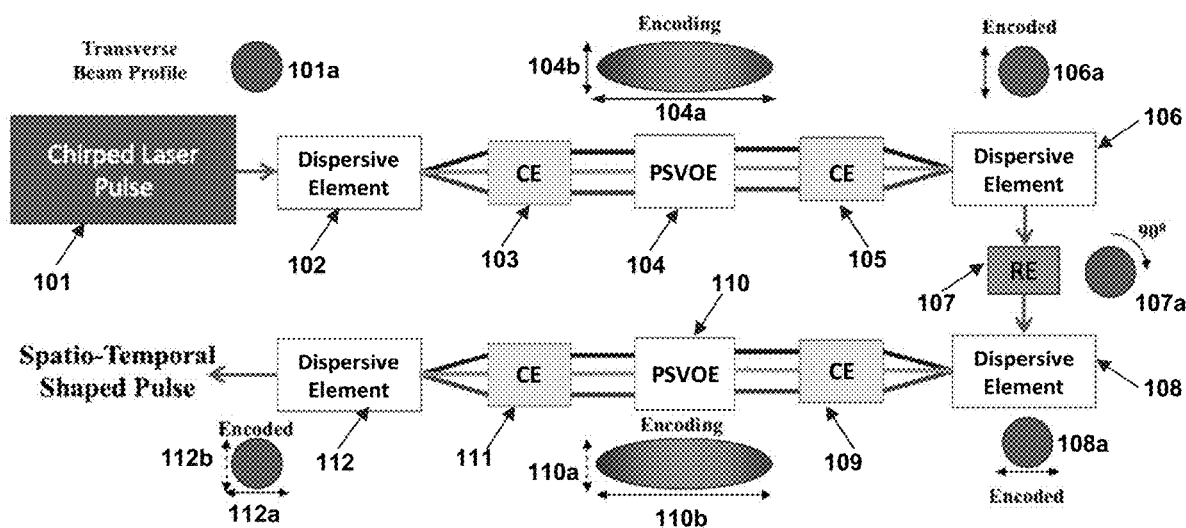
FIG. 1 is a block schematic illustrating an exemplary Adaptive Spatio-Temporal Optical Pulse Shaper (A-STOPS) architecture in accordance with the present invention.

The block schematic in FIG. 1 illustrates an exemplary embodiment of an apparatus that can be used to implement the A-STOPS laser field shaping scheme in accordance with the present invention.

As illustrated in FIG. 1, such an apparatus includes a laser source 101, Dispersive Elements 102, 106, 108, and 112, Collimating Elements (CE) 103, 105, 109, and 111, a rotating element 107, and Programmable Spatial Varying Optical Elements (PSVOE) 104 and 110.

Dispersive Elements 102, 106, 108, and 112 can be in the form of any suitable dispersive element such as a reflective/transmissive grating or prism, while Collimating Elements 103, 105, 109, and 111 can be any suitable optic such as a cylindrical optic or matching dispersive element, rotating element 107 can be any suitable 90 degree rotating element such as a an out-of-plane periscope or prism, and Programmable Spatial Varying Optical Elements 104 and 106 can be controllable optical elements such as controllably deformable mirrors or spatial light modulators.

In accordance with the present invention, laser source 101 produces a laser beam of temporally chirped laser pulses 101a, each pulse having a predetermined temporal beam profile consisting of time varying frequency content, or "temporal chirp." Each temporally chirped pulse is directed into a first dispersive element, shown in FIG. 1 as Dispersive Element 102, which spatially spreads the pulse by spreading its frequency components in one transverse dimension.

The beam is then directed into a collimating element 103, which removes the angular components of the frequency spread applied by dispersive element 102 and collimates the spatially chirped pulses to produce a collimated, beam with spatially varying frequency, or "spatial chirp", in one dimension. The temporal information about the beam has now been mapped into each pulse's beam's spatial information along the dimension of the spatial chirp.

The collimated beam of spatially chirped pulses is then directed into PSVOE 104, e.g., a deformable mirror or other suitable optical element, which encodes a predetermined set of programmable information into each frequency by varying its phase and/or amplitude in a direction 104b perpendicular to the direction 104a of its spatial chirp to produce a beam of spatially encoded pulses. By encoding only in the direction perpendicular to the spatial chirp, no higher order dispersion is introduced, simplifying the application. To achieve this, the individual sub-elements of the PSVOE must be much smaller than the undispersed beam size and the element itself must be larger than the dispersed beam dimension.

The encoded spatial dispersion of the pulse 104a is then removed by a second collimating element 105, which applies an angular component to collect the frequency components and a second dispersive element 106, to remove the angular component from the frequencies and thus the spatial chirp from the pulses. This maps the spatial information back into temporal information, resulting in a pre-determined, controllable encoded pulse 106a that carries a user-defined time-varying electric field profile of the pulse's phase and amplitude in one spatial dimension. This user control over the characteristics of this encoded pulse is enabled via the first PSVOE, shown as PSVOE 104 in FIG. 1, which can be controlled by the device's opto-mechanical properties and controls to provide a predetermined resolution and level of control on the applied spatial profile.

To access the perpendicular dimension of each pulse, the encoded pulse is then rotated 90 degrees by rotating element 107, e.g., a prism or periscope, to form rotated pulse 107a. The rotated pulse is then passed back through the system through a second set of optical elements corresponding to the first optical elements to impart predetermined temporal coding of information on the pulse.

Thus, as illustrated in FIG. 1, dispersive element 108 receives rotated, encoded pulse 108a and spatially spreads the pulse by spreading its frequency components in one transverse dimension. The pulses are passed to collimating element 109, that removes the angular components of the frequency spread, mapping temporal information into spatial information, and then to PSVOE element 110, which further imparts a predetermined set of information onto each frequency by varying its phase and/or amplitude in dimension 110a perpendicular to the direction of its spatial chirp.

The thus-encoded pulses are then passed to collimating element 111, which collects the encoded spatially spread pulses and directs them to dispersive element 112. Dispersive element then removes any remaining angular dispersion of the frequencies from the encoded pulses, mapping spatial information back to temporal information, producing a beam of fully encoded spatio-temporally shaped pulses that are encoded in both spatial dimensions 112a and 112b.

The optical elements of such an apparatus in accordance with the present invention can each apply the same or a different spatial variation on the pulses in the beam to impart symmetric or asymmetric transverse information on the beam. Combining this device with a programmable dispersive element such as an acoustic-optical programmable dispersive filter allows for the generation of pulses with arbitrary spatio-temporal profiles. This could be achieved at refresh rates upwards of 10 kHz using currently available components.

Figure 2:
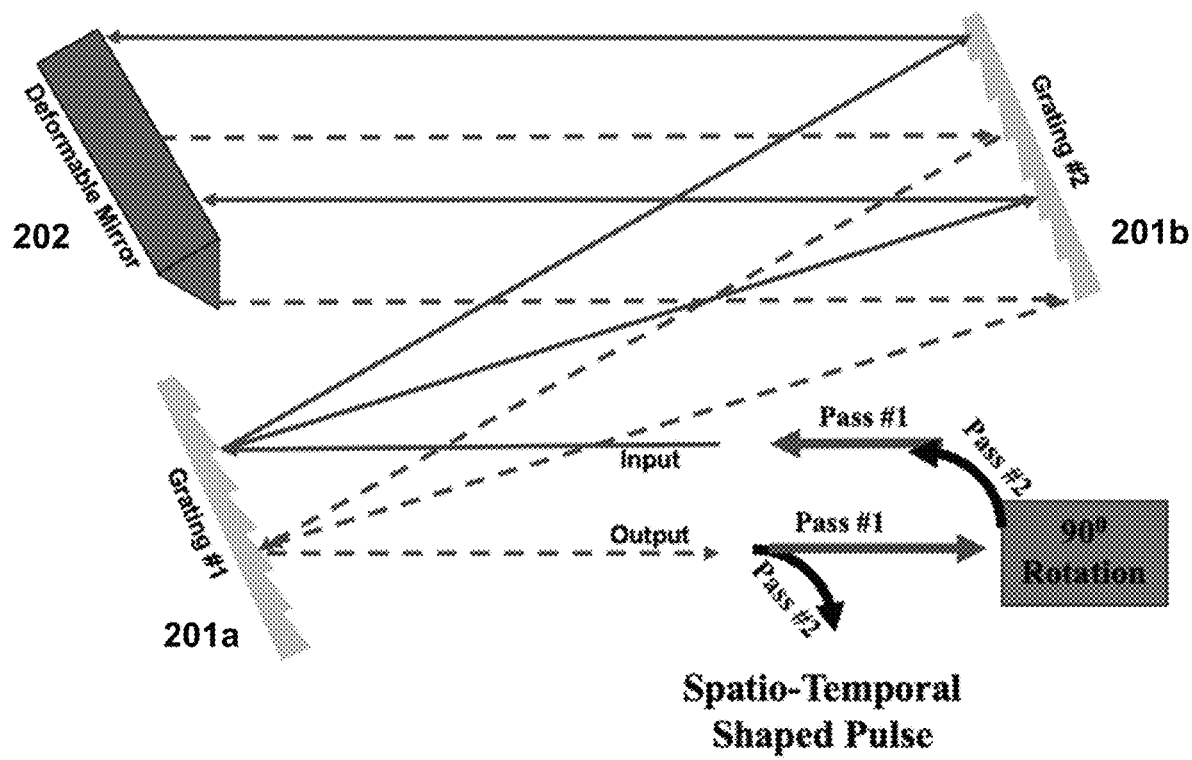
FIG. 2 is a block schematic illustrating an exemplary embodiment of a compact grating-based A-STOPS architecture using deformable mirrors to apply spatial information on a laser pulse in accordance with the present invention.

An example of how the spatio-temporal programming of a laser pulse in accordance with the present invention can be implemented in a more compact scheme using actual optical elements is given in FIG. 2.

FIG. 2 illustrates and exemplary compact grating-based A-STOPS apparatus that uses gratings as the Dispersive Elements and deformable mirrors as the PSVOE described above to apply spatial information to the laser pulse. This setup is ideal for high energy pulses since it relies only on reflective optics that have higher damage thresholds and minimize nonlinear effects.

In this apparatus, the two grating elements, Grating #1 (201a) and Grating #2 (201b), are used as the Dispersive Elements and Collimating Elements described above, i.e., to spatially disperse and collimate the frequency content of the broadband beam. Controllably Deformable Mirror 202 acts as the PSVOE elements described above to encode spatially varying information onto the pulse and return the pulse back through the grating pair, converting the spatial frequency dispersion into a temporal dispersion. The beam is then rotated 90° and passed back through the system, i.e., to Grating #1 (201a) and #2 (201b), wherein the beam is again displaced by Deformable Mirror 202 so that spatial information independent from the information applied on the first pass can be encoded. The beam exiting the system after this second pass is fully spatio-temporal shaped.

The reflective optics and deformable mirror are used to increase power handling and prevent nonlinearities occurring within transmissive optics. It should be noted that although the embodiment illustrated in FIG. 2 relies on two grating elements (Gratings #1 and #2 in the FIGURE), in other embodiments, the dispersion and collimation could be done using multiple dispersive elements or even a single one with modification to the beam routing optics. In other embodiments, transmission optics and/or other programmable optics can be substituted for lower power applications.

Example

To illustrate the effects that such pulse shaping have on a nonlinearly propagating beam, fully 3-D simulations of the apparatus and method of the present invention were run using the PyCAP nonlinear propagation code developed at the U.S. Naval Research Laboratory. For this simulation, a 40 cm×40 cm×40 ps box on a 512×512×512 grid was used to simulate the propagation of an 800 nm, 1ops long pulse with a $P/P_{Crit}=12$ and an initial Gaussian spot size, where $P_{Crit}$ is the critical power for Kerr nonlinear self-focusing, typically ~5 GW in air. The long pulse used was used to minimize nonlinear temporal effects and to better model a chirped pulse. Dispersion was not included in these simulations.

Two pulses were modeled.

The first modeled pulse had no spatio-temporal shaping and collapsed nonlinearly after a distance, $L_{Range}$, a predetermined desired range for the laser beam.

The second modeled pulse had a time varying focus $f_t(t)$ such that $$\frac{1}{f_t(t)} = \frac{1}{L_{Range}} - \frac{1}{f_{NL}(t)}$$

where $$f_{NL}(t) \sim \frac{\pi R_0^2}{2\lambda \sqrt{P(t)/(P_{Crit})^{-1}}},$$

and where $L_{Range}$ is a predetermined desired range for the laser beam, $R_0$ is the initial beam size, $\lambda$ is the central wavelength of the pulse, and $P(t)$ is its time varying power.

Figures 3A, 3B:
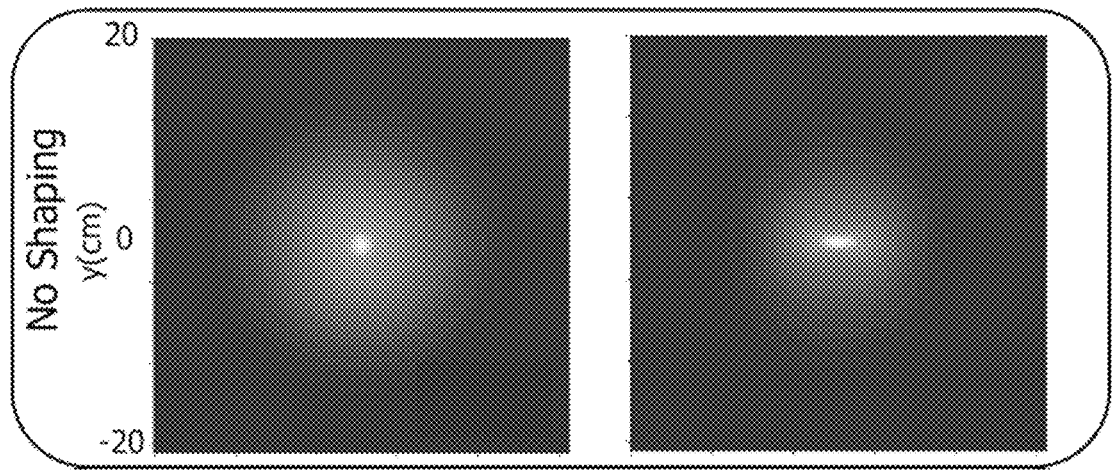
FIGS. 3A-3D show simulated beam profiles of a high-peak power laser undergoing nonlinear self-focusing without (FIGS. 3A and 3B) and with (FIGS. 3C and 3D) spatio-temporal shaping in accordance with the present invention.
Figures 3C, 3D:
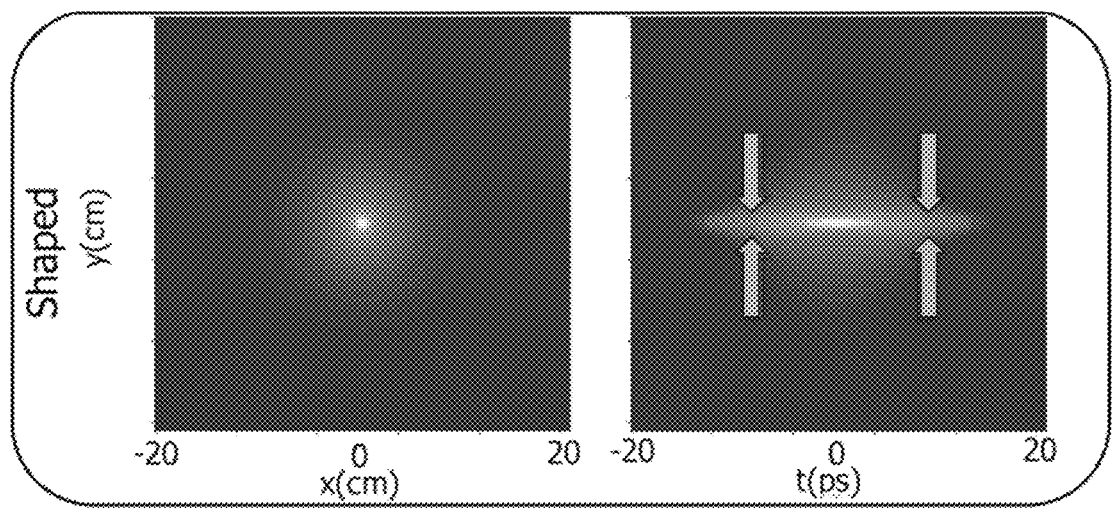

FIGS. 3A and 3B show the results of this modeling for a pulse with no shaping, while FIGS. 3C and 3D show the results for a pulse that has undergone spatio-temporal shaping in accordance with the present invention. FIGS. 3A and 3C show the transverse profile of these pulses, while FIGS. 3B and 3D show a slice of the pulse in y and time.

As shown in FIGS. 3A and 3C, the beam energy contained within the central spot of a pulse 3C that has been spatio-temporally shaped in accordance with the present invention shows a 2.5× increase as compared to an unshaped pulse 3A.

FIGS. 3B and 3D show the beam energy distribution in the time domain. As shown in FIG. 3B, without pulse shaping, the laser pulse energy at the front (left hand side) and rear (right hand side) is poorly concentrated and thus produces a lower intensity at the center of the beam (along the y=0 cm line). In contrast, as shown in FIG. 3D, the energy at the front and rear of the shaped pulse is significantly more concentrated, producing higher intensity at the center of the beam (along the y=0 cm line).

Advantages and New Features

There is no known technique that provides the flexibility for producing high power spatio-temporal shaped laser pulses provided by the present invention.

The Adaptive Spatio-Temporal Optical Pulse Shaper (A-STOPS) apparatus and method of the present invention allows for the active encoding of varying spatial profiles on the full-time history of a chirped pulse. This is done by combining the ability of a chirped pulse stretcher to convert time to space and back with the ability of a programmable spatial varying optical element to apply arbitrary spatial field profiles to the pulse.

To illustrate the utility of such a device, a time-varying geometric focus can be applied such that the front and the back have a shorter focal length than the peak of the pulse. See Froula et al., supra. This is of great utility for pulses undergoing Kerr nonlinear focusing where the peak of the pulse nonlinearly focuses sooner than the front and the back. By properly tailoring the spatio-temporal profile, all temporal portions of the pulse can focus at the same point, enabling the adaptive control necessary for optimization and/or correction for any pulse-to-pulse variations in the laser pulse or the nonlinear media.

As discussed above, using fixed tailored optics or programming in one dimension are the only methods currently available to spatio-temporally shape pules. While these approaches can produce spatio-temporal profiles in the pulse, they lack flexibility, with any changes in requirements due to upstream optics or interactions requiring that a new set of optics be made.

In summary, the A-STOPS apparatus and method in accordance with the present invention provides the ability to obtain programmable spatio-temporal chirped pulses for adaptive control of nonlinear pulses. Such an approach is general and can be adapted to any chirped laser system operating at any arbitrary wavelength and/or repetition rate.

Although particular embodiments, aspects, and features have been described and illustrated, one skilled in the art would readily appreciate that the invention described herein is not limited to only those embodiments, aspects, and features but also contemplates any and all modifications and alternative embodiments that are within the spirit and scope of the underlying invention described and claimed herein. The present application contemplates any and all modifications within the spirit and scope of the underlying invention described and claimed herein, and all such modifications and alternative embodiments are deemed to be within the scope and spirit of the present disclosure.

What is claimed is:

1. An adaptive spatio-temporal optical pulse shaper (A-STOPS) apparatus, comprising:
   a laser source that emits a beam of laser pulses, each having a predetermined temporal chirp comprising a plurality of frequency components;
   a first dispersive element that receives the beam of laser pulses and spatially spreads each pulse in the beam by spreading the frequency components of the laser pulse spatially in one transverse dimension to produce a plurality of spatially chirped pulses;

a first collimating element that receives the spatially chirped pulses from the first dispersive element, removes the angular spreading of the frequency components from each pulse, and collimates the spatially chirped pulses to produce a first collimated beam where temporal information about the beam is mapped into each pulse's spatial information;

a first programmable spatial varying optical element that encodes first predetermined programmable information onto each pulse by varying its phase and/or amplitude in a direction perpendicular to a direction of the pulse's spatial chirp to produce a beam of spatially encoded pulses;

a second collimating element that receives the beam of spatially encoded pulses and angularly collects the frequency components of each pulse to remove the spatial chirp of the spatially encoded pulses;

a second dispersive element that receives the beam of spatially encoded pulses and removes any residual angular dispersion from the beam of spatially encoded pulses to produce a second collimated beam where frequency dependent spatial information about the beam is mapped into each pulse's temporal information producing predetermined, controllable non-dispersed beam of spatially encoded pulses that each carry a user-defined time-varying electric field profile of the pulse's phase and amplitude in one spatial dimension;

a rotating element that receives the beam of spatially encoded pulses from the second dispersive element and rotates each of the pulses 90 degrees;

a third dispersive element that receives the rotated pulses from the rotating element and spatially spreads each pulse in the beam by spreading the frequency components of the laser pulse spatially in one transverse dimension parallel to the encoding to produce a plurality of spatially chirped pulses;

a third collimating element that receives the beam of temporally dispersed pulses from the third dispersive element and removes the angular spreading of the frequency components from each pulse, and collimates the spatially chirped pulses to produce a first collimated beam where temporal information about the beam is mapped into the dimension parallel to encoding of the pulses;

a second programmable spatial varying optical element that receives the collimated beam of spatially chirped pulses and encodes second predetermined programmable information onto each spatially chirped pulse by varying its phase and/or amplitude in a direction perpendicular to a direction of the pulse's spatial chirp to produce a beam of pulses encoded in both dimensions;

a fourth collimating element that receives the beam of spatially encoded pulses and angularly collects the frequency components of each pulse to remove the spatial chirp of the spatially encoded pulses; and a fourth dispersive element that removes any residual angular dispersion from the beam of spatially encoded pulses to produce a fourth collimated beam where frequency dependent spatial information about the beam is mapped into each pulse's temporal information produce a beam of fully encoded spatio-temporally shaped pulses that are encoded in both spatial dimensions.

2. A method for forming a beam of spatio-temporally shaped laser pulses, comprising:

emitting, from a laser source, a beam of laser pulses, each having a predetermined temporal chirp comprising a plurality of frequency components;

directing the beam of temporally chirped laser pulses into a first dispersive element that receives the beam of laser pulses and spatially spreads each pulse in the beam by spreading the frequency components of the laser pulse spatially in one transverse dimension to produce a plurality of spatially chirped pulses;

directing the spatially chirped pulses from the first dispersive element into a first collimating element removes the angular spreading of the frequency components from each pulse, and collimates the spatially chirped pulses to produce a first collimated beam where temporal information about the beam is mapped into each pulse's spatial information;

directing the first collimated beam into a first programmable spatial varying optical element that encodes first predetermined programmable information onto each pulse by varying its phase and/or amplitude in a direction perpendicular to a direction of the pulse's spatial chirp to produce a beam of spatially encoded pulses;

directing the beam of spatially encoded pulses into a second collimating element receives the beam of spatially encoded pulses and angularly collects the frequency components of each pulse to remove the spatial chirp of the spatially encoded pulses;

directing the beam of spatially encoded pulses into a second dispersive element removes any residual angular dispersion from the beam of spatially encoded pulses to produce a second collimated beam where frequency dependent spatial information about the beam is mapped into each pulse's temporal information producing predetermined, controllable non-dispersed beam of spatially encoded pulses that each carry a user-defined time-varying electric field profile of the pulse's phase and amplitude in one spatial dimension;

directing the non-dispersed beam of spatially encoded pulses into a rotating element that rotates each of the pulses 90 degrees;

directing the rotated pulses from the rotating element into a third dispersive element that spatially spreads each pulse in the beam by spreading the frequency components of the laser pulse spatially in one transverse dimension parallel to the encoding to produce a plurality of spatially chirped pulses;

directing the beam of spatially chirped pulses into a third collimating element that that receives the beam of temporally dispersed pulses from the third dispersive element and removes the angular spreading of the frequency components from each pulse, and collimates the spatially chirped pulses to produce a first collimated beam where temporal information about the beam is mapped into the dimension parallel to encoding of the pulses;

directing the collimated beam of spatially chirped encoded pulses into a second programmable spatial varying optical element encodes second predetermined programmable information onto each spatially chirped pulse by varying its phase and/or amplitude in a direction perpendicular to a direction of the pulse's spatial chirp to produce a beam of pulses encoded in both dimensions;

directing the beam of spatially and temporally encoded pulses into a fourth collimating element that receives the beam of spatially encoded pulses and angularly collects the frequency components of each pulse to remove the spatial chirp of the spatially encoded pulses; and directing the collimated beam of spatially and temporally encoded pulses into a fourth dispersive element that removes any residual angular dispersion from the beam of spatially encoded pulses to produce a fourth collimated beam where frequency dependent spatial information about the beam is mapped into each pulse's temporal information produce a beam of fully encoded spatio-temporally shaped pulses that are encoded in both spatial dimensions.

\* \* \* \* \*